United States Patent
White

(10) Patent No.: US 6,435,519 B1
(45) Date of Patent: Aug. 20, 2002

(54) STRESS-INDUCED GASKET

(76) Inventor: Patrick Michel White, 2208 Lancaster Ct., Mahwah, NJ (US) 07430

( * ) Notice: Subject to any disclaimer, the term of this patent is extended or adjusted under 35 U.S.C. 154(b) by 0 days.

(21) Appl. No.: 09/440,064

(22) Filed: Nov. 15, 1999

Related U.S. Application Data

(63) Continuation-in-part of application No. 09/311,938, filed on May 14, 1999, now abandoned.

(51) Int. Cl.$^7$ ................................................ F16J 15/02
(52) U.S. Cl. ........................ 277/609; 277/627; 277/650
(58) Field of Search ................................ 277/604, 608, 277/609, 626, 627, 644, 650

(56) References Cited

U.S. PATENT DOCUMENTS

| | | | |
|---|---|---|---|
| 3,971,566 A | 7/1976 | Levinsohn et al. ......... 277/206 |
| 4,281,841 A | 8/1981 | Kim et al. .................. 277/236 |
| 4,283,079 A | * 8/1981 | Flaherty |
| 4,515,213 A | * 5/1985 | Rogen et al. |
| 4,537,406 A | 8/1985 | Hirasuna ....................... 277/1 |
| 4,665,906 A | 5/1987 | Jervis ............................ 128/92 |
| 4,773,680 A | 9/1988 | Krumme ..................... 285/381 |
| 4,896,955 A | 1/1990 | Zider .......................... 351/41 |
| 5,067,827 A | 11/1991 | Bokel ......................... 384/537 |
| 5,120,175 A | 6/1992 | Arbegast et al. ............ 411/501 |
| 5,190,546 A | 3/1993 | Jervis .......................... 606/78 |
| 5,197,720 A | 3/1993 | Renz et al. ................ 269/48.1 |
| 5,226,683 A | 7/1993 | Julien et al. ................ 285/363 |
| 5,277,435 A | 1/1994 | Krammer et al. ............ 279/9.1 |
| 5,353,319 A | * 10/1994 | Challberg |
| 5,366,331 A | 11/1994 | Erbes .......................... 411/433 |
| 5,385,396 A | 1/1995 | Beck et al. ............... 303/119.2 |
| 5,395,193 A | 3/1995 | Krumme et al. ............ 411/339 |
| 5,407,322 A | 4/1995 | Charbonnel et al. ........ 415/160 |
| 5,507,826 A | 4/1996 | Besselink et al. .............. 623/22 |
| 5,536,126 A | 7/1996 | Gross ........................... 411/411 |
| 5,584,631 A | 12/1996 | Krumme et al. ............ 411/339 |
| 5,586,983 A | 12/1996 | Sanders et al. ................ 606/61 |
| 5,597,378 A | 1/1997 | Jervis ........................... 606/78 |
| 5,626,581 A | * 5/1997 | Staehlin et al. |
| 5,662,362 A | 9/1997 | Kapgan et al. .......... 285/381.1 |
| 5,674,027 A | 10/1997 | Warnaar ...................... 403/404 |
| 5,683,404 A | 11/1997 | Johnson ....................... 606/151 |
| 5,766,218 A | 6/1998 | Arnott ......................... 606/151 |
| 5,779,281 A | 7/1998 | Kapgan et al. ........ 285/148.19 |
| 5,779,707 A | 7/1998 | Bertholet et al. ............. 606/75 |
| 5,791,847 A | 8/1998 | Ket-Tokoi ................... 411/368 |
| 5,842,312 A | 12/1998 | Krumme et al. ........... 52/167.1 |
| 5,858,020 A | 1/1999 | Johnson et al. ............... 623/23 |
| 5,862,995 A | 1/1999 | Wu ........................... 239/533.2 |
| 5,876,434 A | 3/1999 | Flomenblit et al. ............ 623/1 |
| 6,176,331 B1 | * 1/2001 | Jin et al. |
| 6,258,182 B1 | * 7/2001 | Schetky et al. |

OTHER PUBLICATIONS

Nitinol SE 508 Data Sheet, Nitinol Devices & Components, Inc., Revision A, ECO 1436.*

* cited by examiner

*Primary Examiner*—Anthony Knight
*Assistant Examiner*—John L. Beres
(74) *Attorney, Agent, or Firm*—John L Chiatalas

(57) ABSTRACT

A non-corrosive metallic sealing assembly is disclosed. The assembly has a first sealing surface and a second sealing surface with a gasketing member being interposed between the first and second sealing surfaces. The gasketing member has a top sealing surface engaging the first sealing surface and a bottom sealing surface engaging the second sealing surface, respectively. The gasket member is preferably a flat washer made of a super-elastic alloy, such as nitinol, wherein the gasket member elastically bends to effect a seal between the first and second members when its sealing surfaces are fully engaged.

18 Claims, 3 Drawing Sheets

STRESS-INDUCED GASKET

This application is a continuation-in-part of Ser. No. 09/311,938 entitled "Stress Induced Seal", filed on May 14th, 1999 now abandoned.

TECHNICAL FIELD

The present invention relates generally to metallic shape memory gaskets, particularly those having one or more components made of material that possesses super-elastic properties suitable for high-performance industrial applications that involve differing ranges of operating temperatures and component materials being sealed.

BACKGROUND

This application is an improvement of the invention shown in Applicant's co-pending Ser. No. 09/311,938, filed May 14th, 1999 and entitled, "Stress-Induced Seal", the entire disclosure of which is expressly incorporated by reference herein and relied upon The use of metallic shape memory material, such as Ni—Ti (nitinol) and other bi- or tri-metal alloys, has been documented in a variety of technical applications, including fasteners, connectors, clamps and seals. Many such uses have required temperature in order to activate the shape memory material and change its physical state, while others have used mechanical forces that impart stress to cause a super-elastic physical deformation in the material. Still others have employed a combination of temperature and mechanical stress causing a shape memory effect to function in a desired product. As will be seen, however, not all shape memory materials are pseudo-elastic, because not all exhibit super-elastic behavior at their operating temperatures. These various prior approaches are detailed in the references discussed herein. Of particular concern to the instant inventor is the applicability of this technology to gaskets. The use of non-corrosive, metallic shape memory material offers a decided advantage in high performance gasketing environments, versus pliable synthetic rubber or silicone materials, in its ability to withstand a more substantial sealing load under extremes of pressure and temperature while not drying up the way rubbers and silicones can.

U.S. Pat. No. 4,896,955 to Zider and Krumme, entitled "Eyeglass Frame Including Shape Memory Elements", characterizes the use of nickel-titanium shape memory alloys that have super-elastic or pseudo-elastic properties. In criticizing these materials, it is said that the effective useful temperature range for such purely pseudo-elastic components in eyeglass frames is too narrow. This limitation was further said to be remedied by fabrication of such components from materials having "optimized elasticity" properties, that is, work-hardened shape memory alloys. In U.S. Pat. Nos. 5,395,193 and 5,584,631, also co-invented by Krumme, the aforementioned optimized elastic materials are further incorporated in a Belleville fastener said to be useful in eyeglass frames. However, Krumme makes no mention of a gasket nor can the same be fairly implied from its disclosure. U.S. Pat. No. 5,683,404 to Johnson, entitled "Clamp and Method for its Use", further discusses shape memory materials that are "pseudo-elastic", defining these materials in terms of their ability to exhibit super-elastic/pseudo-elastic recovery characteristics at room temperature. Such materials are said to deform from an austenitic crystal structure to a stress-induced structure postulated to be martensitic in nature, returning thence to the austenitic state when the stress is removed. The alternate crystal structures described give the alloy super-elastic or pseudo-elastic properties. Poisson's Ratio for nitinol is about 0.3, but this ratio significantly increases up to approximately 0.5 or more when the shape memory alloy is stretched beyond its initial elastic limit. It is at this point that stress-induced martensite is said to occur, i.e., the point beyond which the material is permanently deformed and thus incapable of returning to its initial austenitic shape. A special tool is employed by Johnson to impart an external stretching force that deforms the material which force is then released to cause the material to return to its original condition. While the device is stretched, a member is captured by it and securely clamped when the stretching force is released. This activation of the shape memory component is by application of ail external force to that component, rather than activation of one component by another. Another use envisioned by the aforementioned inventor is to connect the modular components of a medical device, as described in U.S. Pat. No. 5,858,020, by subjecting a component made of shape memory material to an external, i.e., stretching stimulus. A binding or strap device is described in U.S. Pat. No. 5,766,218 to Arnott, ostensibly to provide compressive force via a tensioning loop member of shape memory material. Such clamping operations as noted immediately above require a special tensioning tool and means on the device to attach the tool and impart a stretching/tensioning force. Moreover, none of these contemplate a gasketing operation.

U.S. Pat. No. 5,190,546 to Jervis discloses insertion into a bone cavity of a member made of shape memory material. The walls of the bone cavity are said to impart a compressive force on the member due to interference fit, to cause it to deform and be held in tension within the cavity. The ability of bone matter to withstand such an insertion force without cracking seems highly improbable; indeed, there is no evidence presented that such a result does not occur in the body. Nor is any gasketing function contemplated.

Others have sought to utilize the properties of shape memory materials as locking, connector and bearing elements, e.g., U.S. Pat. Nos. 5,507,826 to Besselink, et al., 5,779,281 to Kapgan, et al., and 5,067,827 to Arnold, respectively; however, such approaches have required temperature to be applied during use. U.S. Pat. Nos. 5,277,435 to Kramer, et al. and 5,876,434 to Flomenblit, et al. similarly relied upon temperature to activate the shape memory effect. Such dependence on extrinsic activation by temperature introduces an added process step and may further be disadvantageous in certain other applications, e.g., seals, where temperature extremes are ordinarily encountered during conditions of use.

U.S. Pat. No. 5,226,683 to Julien, et al., entitled, "Reusable Metallic Seal Using Memory Metal", employs a continuous annulus of binary metal or super-elastic material which can be compressed between two surfaces to create a seal. However, the surfaces being sealed must have a yield strength higher than the seal so that it can deform into the surface irregularities creating the seal.

None of the above-mentioned prior approaches have contemplated the formation of an effective gasket such as envisioned by the present inventor. Moreover, a key feature of certain gaskets is their ability to accommodate changes of differing kinds in the members being sealed, such as thermal expansion. Pliable rubbers and silicones, for example, have this characteristic; however, the operating demands are decidedly different in high performance, metallic gasketing applications.

Accordingly, it is an object of the invention to form a durable metallic, non-corrosive gasket, beginning with a shape memory material in its austenitic state and inducing a super-elastic behavior via stress-induction to form an effective high performance gasket. Moreover, it is an object to provide a gasketing assembly wherein there is minimal marring or scoring of the components.

It is a further object to form a gasket that decreases the temperature sensitivity of a component made from a shape memory material. Conversely, it is an object to form a stress-induced gasket using a pre-tensioned shape memory alloy that adjusts for differences in thermal coefficients of expansion or contraction of dissimilar materials comprising those components being gasketed.

SUMMARY OF INVENTION

A gasket assembly of the present invention has at least two surfaces being sealed and a gasket member made of a shape memory alloy, wherein the gasket member bends to effect a seal between the first surface and the second surface as they are urged together. Preferably, the bend generates a spring force in the gasket, causing the seal. It is further preferred that the top and bottom surfaces of the gasket are continuous, although in an alternative preferred embodiment they are discontinuous.

In a preferred embodiment, means are provided for imparting a compressive force urging the first and second members into respective sealing engagement with the gasket member. Preferably, a fastener imparts the compressive force.

In another preferred embodiment, the gasket member is a washer, more preferably a flat washer.

In another preferred embodiment, the gasket member is a Belleville washer.

In yet another preferred embodiment, the shape memory alloy of the gasket member is super-elastic and, preferably, elastically reversible for reuse.

A process for forming a seal assembly of the present invention includes the steps of providing a first member and a second member with sealing surfaces, also providing a gasket member made of a super-elastic alloy. The process further includes the step of applying a compressive force to one of the members, wherein the gasket member super-elastically bends to effect a seal between the first and second members.

It is preferable in the process to provide the gasket with top and bottom sealing surfaces that present continuous sealing surfaces, respectively.

It is again preferable in the process to provide a means for imparting a compressive force urging the first and second members into respective sealing engagement with the gasket member. Preferably the force is applied by using a fastener.

An advantage of the present invention is the formation of a high-performance, non-corrosive metallic gasketing assembly from a shape memory material that can be activated in a variety of uses by mechanical stress in a relatively simple operation, while in its austenitic state, with a minimum of sealing surface contact that further avoids marring the metallic components.

Another advantage is a stress-induced gasketing assembly using a pre-tensioned shape memory alloy that adjusts for differences in hardness, and of thermal coefficients of expansion or contraction of dissimilar materials comprising those members being gasketed.

Yet a further advantage of the present invention is a high-performance gasketing assembly wherein the gasket bends or "gives", moving out of the way to form the seal.

The result is that the members being sealed are not marred/scored by the gasket. This allows the gasket to possess hardness greater than the members sealed.

A still further advantage is that the present invention forms a gasketing assembly primarily through bending via edge contact of the gasket with the sealing surfaces of the members.

Other objects and advantages will be appreciated by those skilled in the art, by resort to the appended Drawings having reference numerals that correspond to the ensuing Detailed Description wherein the following Figures are further elucidated.

DETAILED DESCRIPTION OF THE DRAWINGS

Figure 1:
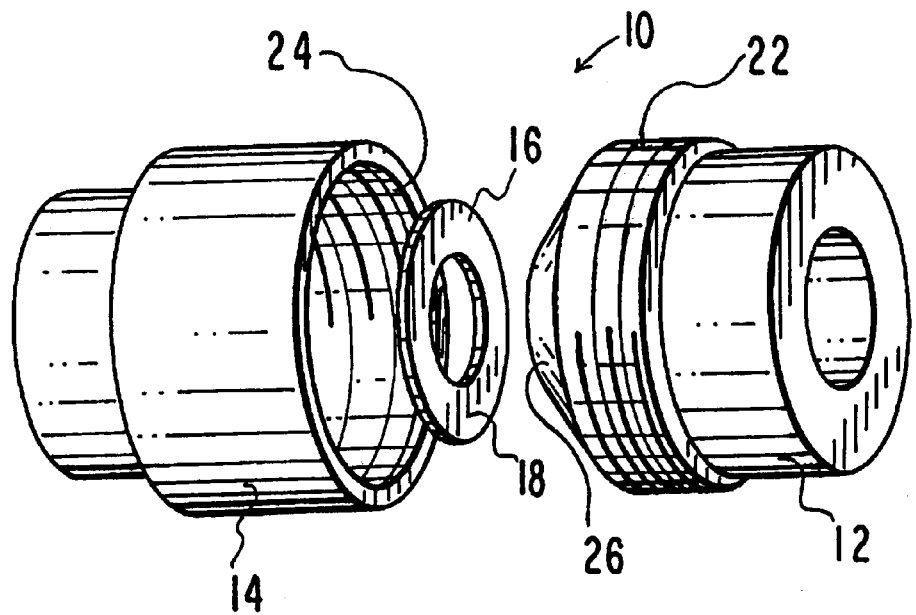
FIG. 1 is an exploded perspective view of a gasketing assembly of the present invention, with one of the members having an edged male end that contacts a preferably continuous gasketing washer, shown prior to assembly according to the method of the present invention.
Figure 2:
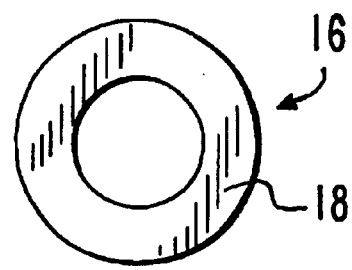
FIG. 2 is a top plan view of the preferred gasketing washer of FIG. 1.
Figure 3:
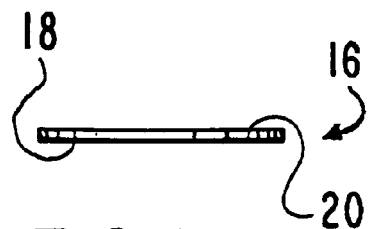
FIG. 3 is a side view of the washer of FIG.2.
Figure 4:
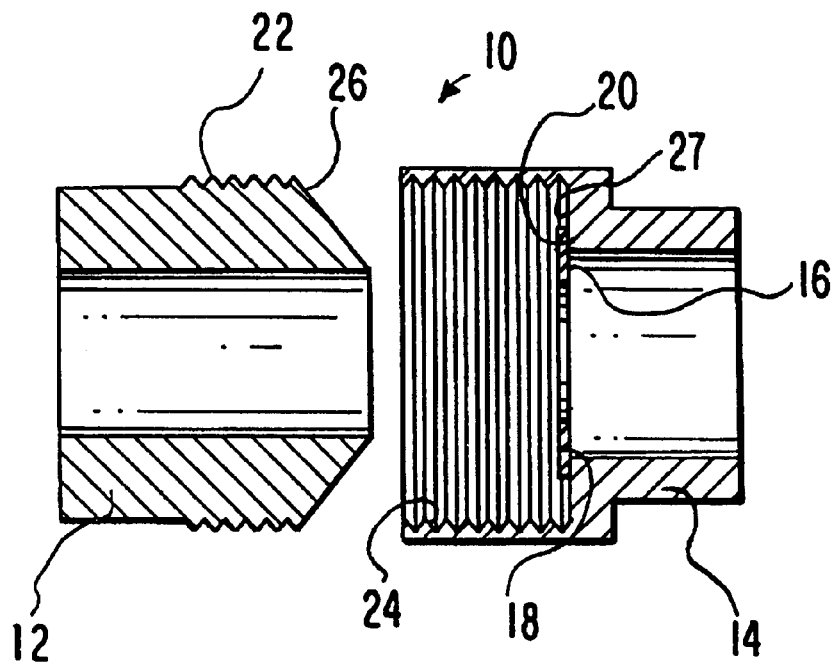
FIG. 4 is an exploded longitudinal section view of the present gasketing assembly, showing the gasket in place prior to engagement of the assembly.
Figure 5:
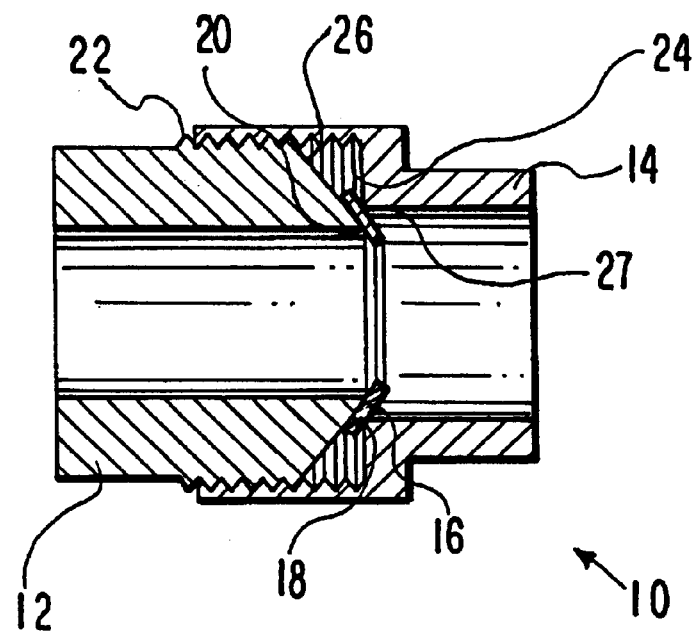
FIG. 5 is a sequential view of FIG. 4, showing the gasket bending as a longitudinal compressive force is applied to engage the gasketing assembly.
Figure 6:
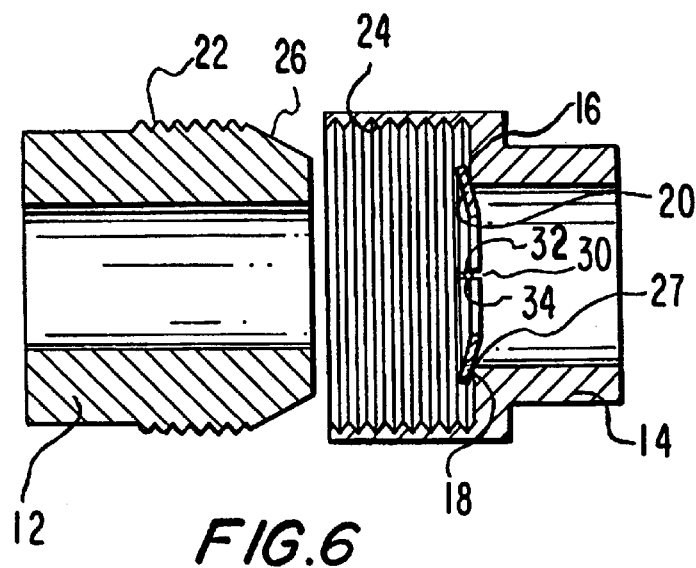
FIG. 6 is an exploded longitudinal section view of another, preferred gasketing assembly of the present invention, showing one of the members with a blunted male end for contacting an alternative gasket member with a discontinuous sealing surface seated in place prior to engagement of the assembly.
Figure 7:
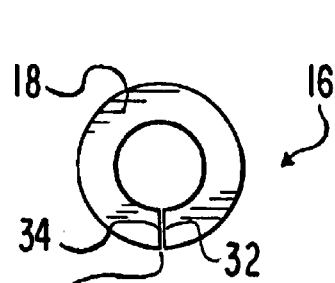
FIG. 7 is a top plan view of the preferred gasketing washer of FIG. 6.
Figure 8:
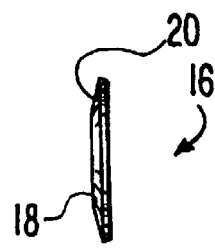
FIG. 8 is a side view of the preferred gasketing washer of FIG. 6.

Referring to FIGS. 1–9, a gasket assembly of the present invention is generally shown at 10. The assembly 10 has at least a first 12 and a second 14 member being sealed, also a gasket member 16 of a shape memory alloy. Gasket member 16 bends (FIGS. 5 and 9) to effect a seal between the first and second members 12, 14 as they are urged together. Preferably, the bend generates a spring force in gasket 16, causing the seal. It is further preferred that top 18 and bottom 20 surfaces of the gasket are continuous, although in an alternative preferred embodiment (FIGS. 6–9) these surfaces 18, 20 are discontinuous.

In a preferred embodiment, means are provided for imparting a compressive force urging the first 12 and second 14 members into respective sealing engagement with gasket member 16. Preferably a coupler, comprised of a male thread 22 on first member 12 and mating female thread 24 on second member 14 together imparts the compressive force when tightened together. Alternatively, the means could be a fastener or other mechanism (not shown) that draws or otherwise urges the pair of members 12, 14 together so that gasketing member 16 is engaged to bend and effect a seal between the members.

Preferably, gasket member 16 is a flat washer, more preferably a Belleville washer. The shape memory alloy of gasket member 16 is preferably a super-elastic material, such as nitinol which is elastically reversible for reuse. Washer 16 is preferably an integral member made of a super-elastic alloy, preferably nitinol, more preferably SE508 nitinol.

This material is described in "Nitinol SE508 Data Sheet", and is available from Nitinol Devices & Components, Inc., located in Fremont, Calif.

A process for forming seal assembly 10 of the present invention includes the steps of providing the first member 12 and second member 14 each with sealing surfaces 26, 28, respectively, also providing gasket member 16 made of a super-elastic alloy. The process further includes the step of applying a compressive force to one of the first and second members 12, 14, wherein gasket member 16 super-elastically bends to effect a seal between the first and second members. The super-elastic material of gasketing member 16 deforms in response to the stress-activated seat formation by the relative motion, conforming to the contour of the engaged members 12, 14.

Figure 9:
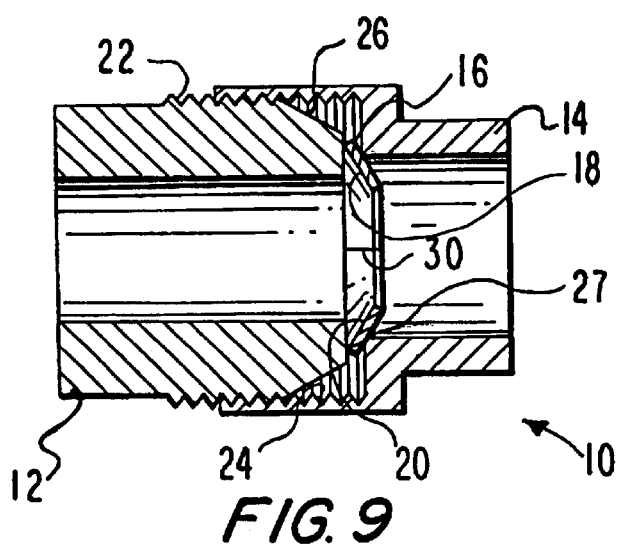
FIG. 9 is a sequential view of FIG. 6, showing the male member contacting the washer and conically deforming it as the members are engaged.

It is preferable in the process to provide the gasket with top 18 and bottom 20 sealing surfaces that present continuous sealing surfaces, respectively. However, in FIG. 6 the gasketing member 16 is conically shaped into a Belleville washer with a split 30 with opposing ends 32, 34. Split 30 causes the top 18 and bottom 20 sealing surfaces to be discontinuous. In FIG. 9, as members 12, 14 are urged together the Belleville washer 16 bends, closing split 30 and forcing ends 32, 34 closed.

It is again preferable in the process to provide a means, such as a fastening coupler, for imparting a compressive force urging the first and second members 12, 14 into respective sealing engagement with gasket member 16. Alternatively, a source of hydraulic or pneumatic pressure (not shown) can be used to effect or assist in effecting the seal formation.

The gasketing assembly 10 could be employed where the first and second members 12, 14 have differing coefficients of thermal expansion or contraction. Similarly, members 12, 14 could have a different hardness from one another and/or versus gasketing member 16. This is because the gasket relies upon minimal edge-to-surface contact and mostly on the elastic deformation of the material, rather than a direct surface-to-surface contact. Such direct contact can cause marring or scoring of metallic surfaces by the different hardness of the materials used.

The means of providing such force could be a threaded fastening coupler, although it is possible to employ pneumatic or hydraulic pressure, or a collet. The force is applied preferably in a longitudinal direction and, unlike the prior art, does not require that the members 12, 14 are moved against gasketing member 16 into surface-to-surface contact with the gasketing member to form a seal. As such, the gasketing member is engaged primarily in an edge-to-surface contact where it bends out of the way, deflecting or "springing-back" to effect the seal. Although not shown, those skilled in the art will appreciate the modifications mentioned immediately above, in conjunction with the various embodiments described herein.

While one or more preferred embodiments of the present invention have been described, it should be understood that various changes, adaptations and modifications may be made without departing from the spirit of the invention and the scope of the appended Claims.

What is claimed is:

1. A sealing assembly comprising:
   a first member with a surface having a first edge;
   a second member with a surface having a second edge; and
   a gasket member made of a super-elastic alloy with top and bottom sealing surfaces,
   whereupon relative motion between the first and second members causes the first edge to contact the top surface, super-elastically bending the gasket to engage the second edge against the bottom surface, effecting a seal between the first and second members.

2. The assembly of claim 1 wherein the super-elastic activation generates a spring force in the gasket, effecting the seal.

3. The assembly of claim 1 wherein the top and bottom surfaces of the gasket are continuous.

4. The assembly of claim 1 further comprising a means for imparting a compressive force urging the first and second members into respective sealing engagement with the gasket member.

5. The assembly of claim 4 wherein the compressive force is imparted by a fastener.

6. The assembly of claim 1 wherein the gasket member is a washer.

7. The assembly of claim 6 wherein the washer is a Belleville.

8. The assembly of claim 1 wherein the gasket member has a discontinuous sealing surface.

9. The assembly of claim 1 wherein the super-elastic alloy of the gasket member is nitinol.

10. The assembly of claim 1 wherein the gasket member is elastically reversible for reuse.

11. A sealing assembly comprising:
    a first member with a surface having a first edge;
    a second member with a surface having a second edge; and
    a gasket member made of a super-elastic alloy with top and bottom sealing surfaces,
    whereupon relative motion between the first and second members causes the second edge to contact the bottom surface, super-elastically bending the gasket to engage the first edge against the top surface, effecting a seal between the first and second members.

12. The assembly of claim 11 further comprising a means for imparting a compressive force urging the first and second members into respective sealing engagement with the gasket member.

13. The assembly of claim 12 wherein the compressive force is imparted by a fastener.

14. The assembly of claim 11 wherein the gasket member is a washer.

15. The assembly of claim 14 wherein the washer is a Belleville.

16. The assembly of claim 11 wherein the gasket member has a generally polygonal cross-section.

17. The assembly of claim 11 wherein the super-elastic alloy of the gasket member is nitinol.

18. The assembly of claim 11 wherein the gasket member is elastically reversible for reuse.

* * * * *